(12) United States Patent
Chen et al.

(10) Patent No.: US 9,344,718 B2
(45) Date of Patent: May 17, 2016

(54) ADAPTIVE UP-SAMPLING FILTER FOR SCALABLE VIDEO CODING

(71) Applicant: QUALCOMM Incorporated, San Diego, CA (US)

(72) Inventors: Jianle Chen, San Diego, CA (US); Vadim Seregin, San Diego, CA (US); Xiang Li, San Diego, CA (US); Krishnakanth Rapaka, San Diego, CA (US); Chengjie Tu, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 13/954,749

(22) Filed: Jul. 30, 2013

(65) Prior Publication Data

US 2014/0044161 A1   Feb. 13, 2014

Related U.S. Application Data

(60) Provisional application No. 61/681,108, filed on Aug. 8, 2012, provisional application No. 61/707,788, filed on Sep. 28, 2012.

(51) Int. Cl.
*H04N 11/04* (2006.01)
*H04N 19/117* (2014.01)
(Continued)

(52) U.S. Cl.
CPC ....... *H04N 19/00066* (2013.01); *H04N 19/117* (2014.11); *H04N 19/159* (2014.11); *H04N 19/187* (2014.11); *H04N 19/46* (2014.11);
(Continued)

(58) Field of Classification Search
CPC . H04N 7/50; H04N 7/26244; H04N 7/26271; H04N 7/26053; H04N 7/26941
See application file for complete search history.

(56) References Cited

U.S. PATENT DOCUMENTS 6,041,145 A * 3/2000 Hayashi ................. H04N 19/61
375/E7.19
7,457,362 B2 * 11/2008 Sankaran ............. H04N 19/159
375/240

(Continued)

FOREIGN PATENT DOCUMENTS

EP   1720358 A2   11/2006
WO  2013074365 A1   5/2013

OTHER PUBLICATIONS

Reichel J., "Joint Scalable Video Model (JSVM) 7", 77. MPEG Meeting; Jul. 17, 2006-Jul. 21, 2006; Klagenfurt; (Motion Picture Expert Group or JSO/IEC JTC1/SC29/WG11),, No. N8242, Oct. 27, 2006, XP030014734; pp. 1-46, section 1.2.3.3, last paragraph section 1.2.5.2, first paragraph.

(Continued)

*Primary Examiner* — Sath V Perungavoor
*Assistant Examiner* — Howard D Brown, Jr.
(74) *Attorney, Agent, or Firm* — Knobbe, Martens, Olson & Bear, LLP

(57) ABSTRACT

Methods and systems for video image coding are provided. Sets of filters may be selected and applied to video information at least partially based on the type of inter layer prediction implemented in coding the video information. Different filters, or filter sets, may be used for inter layer intra prediction, difference domain intra prediction, and/or difference domain inter prediction. Filter selection information may be embedded in the video bit stream.

42 Claims, 8 Drawing Sheets

(51) Int. Cl.
*H04N 19/159* (2014.01)
*H04N 19/70* (2014.01)
*H04N 19/46* (2014.01)
*H04N 19/187* (2014.01)
*H04N 19/82* (2014.01)
*H04N 19/59* (2014.01)
*H04N 7/26* (2006.01)
*H04N 19/33* (2014.01)
*H04N 19/31* (2014.01)

(52) U.S. Cl.
CPC .............. *H04N19/59* (2014.11); *H04N 19/70* (2014.11); *H04N 19/82* (2014.11); *H04N 19/31* (2014.11); *H04N 19/33* (2014.11)

(56) References Cited

U.S. PATENT DOCUMENTS

| | | | | |
|---|---|---|---|---|
| 2003/0118100 A1* | 6/2003 | Honda | ............... | H04N 19/61 375/240.08 |
| 2004/0213470 A1* | 10/2004 | Sato | ............... | H04N 19/176 382/239 |
| 2006/0268991 A1* | 11/2006 | Segall | ............... | H04B 1/66 375/240.24 |
| 2007/0160134 A1 | 7/2007 | Segall | | |
| 2008/0205513 A1* | 8/2008 | Xiong | ............... | H04N 7/50 375/240.01 |
| 2009/0110073 A1* | 4/2009 | Wu | ............... | H04N 7/50 375/240.15 |
| 2010/0002770 A1* | 1/2010 | Motta | ............... | H04N 19/147 375/240.16 |
| 2012/0033728 A1 | 2/2012 | Cho et al. | | |
| 2012/0082242 A1* | 4/2012 | Narroschke | ............... | H04N 19/423 375/240.25 |
| 2012/0268558 A1 | 10/2012 | Choi et al. | | |
| 2013/0163660 A1 | 6/2013 | Boyce et al. | | |
| 2013/0329782 A1* | 12/2013 | Seregin | ............... | H04N 19/00066 375/240.02 |

OTHER PUBLICATIONS

Chen J., et al., "Description of scalable video coding technology proposal by Qualcomm (configuration 1)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012, XP030112967, pp. 1-19.
International Search Report and Written Opinion—PCT/US2013/053634—ISA/EPO—Oct. 17, 2013.
Segall C.A., et al., "Spatial Scalability Within the H.264/AVC Scalable Video Coding Extension", IEEE Transactions on Circuits and Systems for Video Technology, IEEE Service Center, Piscataway, NJ, US, vol. 17, No. 9, Sep. 1, 2007, pp. 1121-1135, XP011193020, ISSN: 1051-8215, DOI: 10.1109/TCSVT.2007.906824.

* cited by examiner

ADAPTIVE UP-SAMPLING FILTER FOR SCALABLE VIDEO CODING

CROSS REFERENCE TO RELATED APPLICATIONS

This application claims benefit to U.S. Provisional Patent Application No. 61/681,108 entitled "ADAPTIVE UP-SAMPLING FILTER FOR SCALABLE VIDEO CODING" filed on Aug. 8, 2012, and U.S. Provisional Patent Application No. 61/707,788 entitled "ADAPTIVE UP-SAMPLING FILTER FOR SCALABLE VIDEO CODING" filed on Sep. 28, 2012; the disclosures of these applications are hereby incorporated by reference in their entirety.

BACKGROUND

1. Field of the Invention

This disclosure relates to video coding, including encoding and decoding of video content, and in particular to intra and inter prediction.

2. Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices may implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. High Efficiency Video Coding (HVEC) includes unit representation of information that includes three block concepts: coding unit (CU), prediction unit (PU), and transform unit (TU). Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY OF THE DISCLOSURE

For purposes of summarizing the disclosure, certain aspects, advantages and novel features have been described herein. It is to be understood that not necessarily all such advantages can be achieved in accordance with any particular embodiment disclosed herein. Thus, the features disclosed herein can be embodied or carried out in a manner that achieves or optimizes one advantage or group of advantages as taught herein without necessarily achieving other advantages as can be taught or suggested herein.

In accordance with some embodiments, a device for coding video information includes a processor and a memory. The processor can be configured to: obtain a first layer and a second layer of video information; identify an image filter set from a plurality of image filter sets based at least in part on an interlayer prediction type associated with the video information, wherein each of the plurality of image filter sets includes one or more image filters; and generate a modified version of the first layer using the first layer and the identified image filter set. The memory can be configured to store the modified version of the first layer.

The device for coding video information of the previous paragraph can include one or more of the following features: the interlayer prediction type can be one of: inter-layer intra prediction, difference domain intra prediction, and difference domain inter prediction. The plurality of image filter sets can include an up-sampling image filter. The second layer of information can provide spatial scalability. The plurality of image filter sets can include a preprocessing filter, and the second layer of information can provide SNR scalability. The plurality of image filter sets can include a down-sampling image filter. The first layer can be a base layer and the second layer can be an enhancement layer. The device can further comprise at least one image filter circuit configured to apply the plurality of image filter sets. The plurality of image filter sets can be stored in the memory. Each of the image filters of the plurality of image filter sets can comprise a plurality of coefficients. Coding can comprise encoding, and the processor can further be configured to encode the coefficients in the video information. At least one of the image filters of the plurality of image filter sets can comprise coefficients {0, 0, 0, 64, 0, 0, 0, 0} for a phase shift of zero, {0, 1, −3, 63, 4, −2, 1, 0} for a phase shift of one, {0, 2, −6, 61, 9, −3, 1, 0} for a phase shift of two, {−1, 3, −8, 60, 13, −4, 1, 0} for a phase shift of three, {−1, 4, −10, 58, 17, −5, 1, 0} for a phase shift of four, {−1, 4, −11, 53, 25, −8, 3, −1} for a phase shift of five, {−1, 4, −11, 50, 29, −9, 3, −1} for a phase shift of six, {−1, 4, −11, 45, 34, −10, 4, −1} for a phase shift of seven, {−1, 4, −11, 40, 40, −11, 4, −1} for a phase shift of eight, {−1, 4, −10, 34, 45, −11, 4, −1} for a phase shift of nine, {−1, 3, −9, 29, 50, −11, 4, −1} for a phase shift of ten, {−1, 3, −8, 25, 53, −11, 4, −1} for a phase shift of eleven, {0, 1, −5, 17, 58, −10, 4, −1} for a phase shift of twelve, {0, 1, −4, 13, 60, −8, 3, −1} for a phase shift of thirteen, {0, 1, −3, 8, 62, −6, 2, 0} for a phase shift of fourteen, and {0, 1, −2, 4, 63, −3, 1, 0} for a phase shift of fifteen. At least one of the image filters of the plurality of image filter sets comprises coefficients {0, −2, 8, 52, 8, −2, 0, 0} for a phase shift of zero, {0, −1, 5, 51, 11, −3, 1, 0} for a phase shift of one, {0, −1, 3, 50, 15, −4, 1, 0} for a phase shift of two, {0, −1, 1, 49, 19, −5, 1, 0} for a phase shift of three, {0, 1, −3, 47, 23, −5, 1, 0} for a phase shift of four, {0, 1, −4, 45, 27, −6, 1, 0} for a phase shift of five, {0, 1, −5, 43, 30, −6, 1, 0} for a phase shift of six, {0, 1, −6, 41, 34, −7, 1, 0} for a phase shift of seven, {0, 2, −7, 37, 37, −7, 2, 0} for a phase shift of eight, {0, 1, −7, 34, 41, −6, 1, 0} for a phase shift of nine, {0, 1, −6, 30, 43, −5, 1, 0} for a phase shift of ten, {0, 1, −6, 27, 45, −4, 1, 0} for a phase shift of eleven, {0, 1, −5, 23, 47, −3, 1, 0} for a phase shift of twelve, {0, 1, −5, 19, 59, 1, −1, 0} for a phase shift of thirteen, {0, 1, −4, 15, 50, 3, −1, 0} for a phase shift of fourteen, and {0, 1, −3, 11, 51, 5, −1, 0} for a phase shift of fifteen. The plurality of image filter sets can comprise a first filter set, a second filter set, and a third filter set, and the processor can be configured to: identify the first filter set when the interlayer prediction type corresponds to inter layer intra prediction, identify the second filter set when the interlayer prediction type corresponds to difference domain intra prediction, and identify the third filter set when the interlayer prediction type corresponds to difference domain inter prediction. The plurality of image filter sets can comprise a first filter set and a second filter set, and the processor can be configured to: identify the first filter set when the interlayer prediction type corresponds to inter layer intra prediction, and identify the second filter set when the interlayer prediction type corresponds to difference domain intra prediction or difference domain inter prediction. The plurality of image filter sets can comprise a first filter set and a second filter set, and the processor can be configured to: identify the first filter set when the interlayer prediction type corresponds to inter layer intra prediction or difference domain intra prediction, and identify the second filter set when the interlayer prediction type corresponds to difference domain inter prediction. For example, the first filter set can have a higher frequency response cut-off than the second filter set.

In accordance with some embodiments, a method of coding video information can include: obtaining a first layer and a second layer of video information, identifying an image filter set from a plurality of image filter sets based at least in part on an interlayer prediction type associated with the video information, wherein each of the plurality of image filter sets includes one or more image filters, and generating a modified version of the first layer using the first layer and the identified image filter set.

In accordance with some embodiments, an apparatus for coding a video bitstream defining a first layer and a second layer of video information can include: means for identifying a filter from a plurality of image filters based at least in part on an interlayer prediction type associated with the video information, means for generating a modified version of the first layer using the first layer and the identified filter, and means for storing the modified version of the first layer.

In accordance with some embodiments, a non-transitory computer-readable medium can have stored thereon instructions that, when executed by a processor, cause the processor to: obtain a first layer and a second layer of video information, identify a filter from a plurality of image filters based at least in part on an interlayer prediction type associated with the video information, and generate a modified version of the first layer using the first layer and the identified filter.

DETAILED DESCRIPTION OF SPECIFIC EMBODIMENTS

Figure 1:
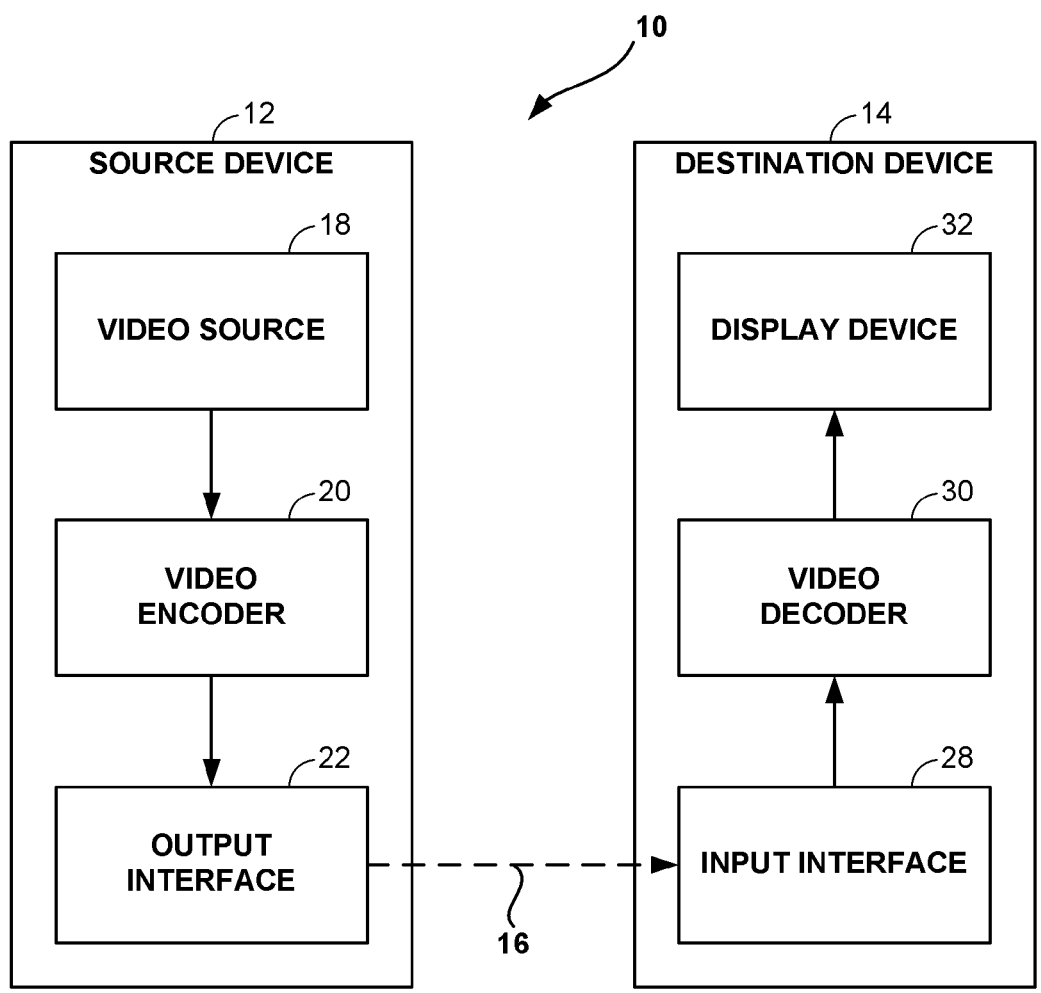
FIG. 1 is a block diagram illustrating an example video coding system that may utilize the techniques of this disclosure.

Scalable video coding (SVC) refers to video coding in which a base layer, sometimes referred to as a reference layer, and one or more scalable enhancement layers are used. For SVC, the base layer can carry video data with a base level of quality. The one or more enhancement layers can carry additional video data to support higher spatial, temporal, and/or signal-to-noise SNR levels. Enhancement layers may be defined relative to a previously encoded layer.

The base layer and enhancement layers can have different resolutions. For example, upsample filtering, sometimes referred to as resample filtering, may be applied to the base layer in order to match a spatial aspect ratio of an enhancement layer. This process may be called spatial scalability. An upsampling filter set can be applied to the base layer, and one filter can be chosen from the set based on a phase (sometimes referred to as a fractional pixel shift). The phase may be calculated based on the spatial aspect ratio between base layer and enhancement layer pictures.

In some systems, only one set of upsampling filters may be used for certain video data. For example, only one set of upsampling filters may be used for luma components, and only one other set of upsampling filters may be used for chroma components. Such systems unfortunately suffer from a lack of flexibility when upsampling a base layer.

In some embodiments of the present disclosure, the techniques of this disclosure increase the flexibility and performance in upsampling video data. The upsampling process advantageously can be performed in an adaptive manner by controlling or changing filters used to code video data, for instance, based at least in part on an interlayer prediction type associated with the video information. For example, a different filter can be selected depending on whether the interlayer prediction type is one of inter-layer intra prediction, difference domain intra prediction, and difference domain inter prediction.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC. In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

An SVC extension may include multiple layers of video information. For example, a bottom layer may serve as a base layer (BL), while a top layer may serve as an enhanced layer (EL). The term "enhanced layer" is used herein according to its broad and ordinary meaning and may be used interchangeably with the term "enhancement layer." Middle layers may serve as either ELs or reference layers (RLs), or both. For example, a layer in the middle may be an EL for the layers below it, such as the base layer or any intervening enhancement layers, and at the same time serve as a RL for one or more enhancement layers above it.

For purposes of illustration only, certain embodiments disclosed herein are described with examples including only two layers (e.g., lower level layer such as the base layer, and a higher level layer such as the enhanced layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, i.e., Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

[0059] FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats such as VP8 and related formats.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video coder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

In accordance with embodiments of this disclosure, video encoder 20 can include an upsampling module 130 may be configured to code (e.g., encode) video data in a scalable video coding scheme that defines at least one base layer and at least one enhancement layer. Upsampling module 130 may upsample at least some video data as part of an encoding process, wherein up sampling is performed in an adaptive manner, such as by using an image filter set selected from a plurality of image filter sets based at least in part on an interlayer prediction type associated with the video data, as described below with respect to FIGS. 4-7, for example.

Figure 2:
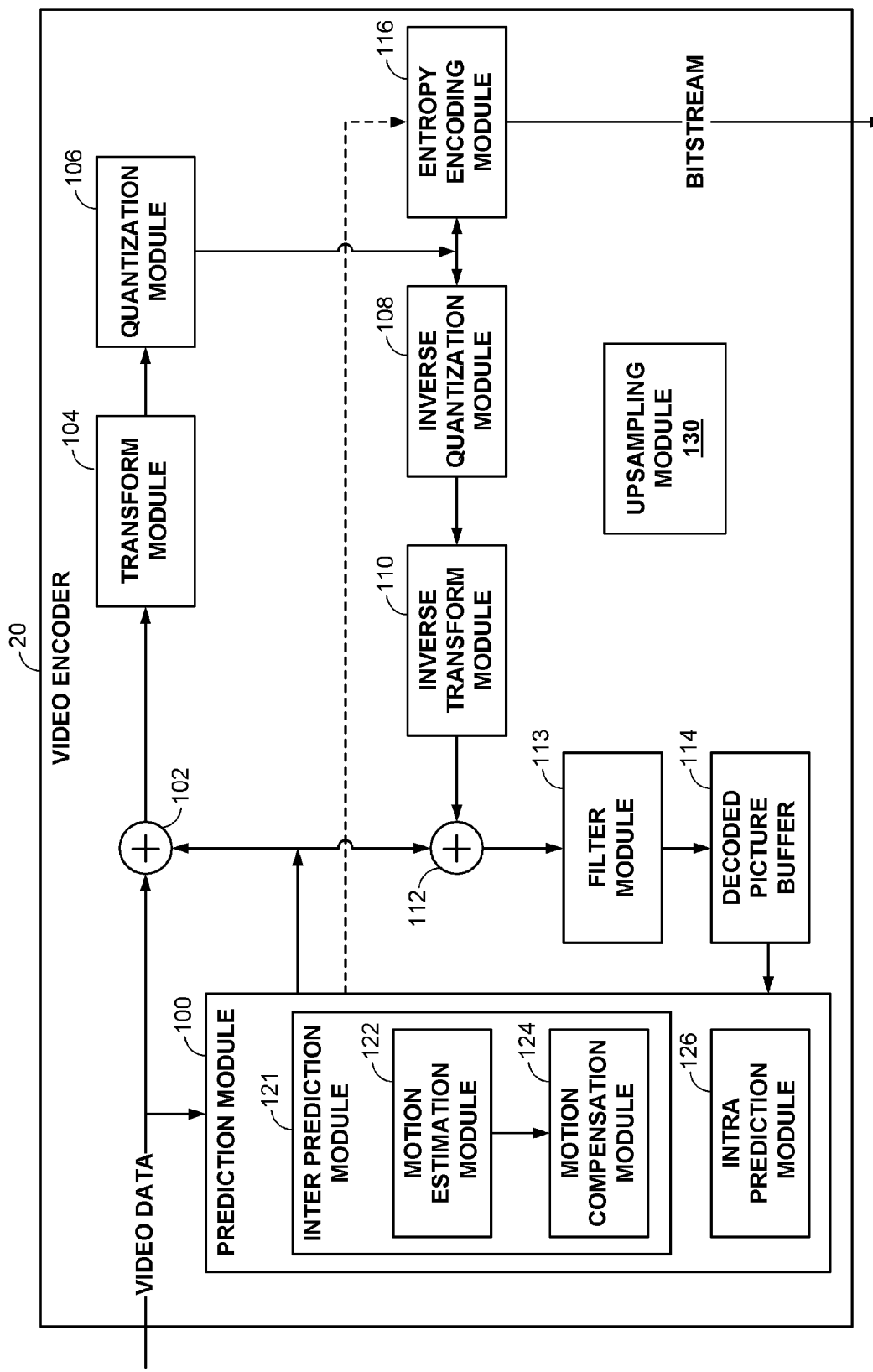
FIG. 2 is a block diagram illustrating an example video encoder that may be configured to implement the techniques of this disclosure.

FIG. 2 is a block diagram that illustrates an example video encoder 20 that can be configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predicted video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU. In another example, motion estimation module 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Figure 3:
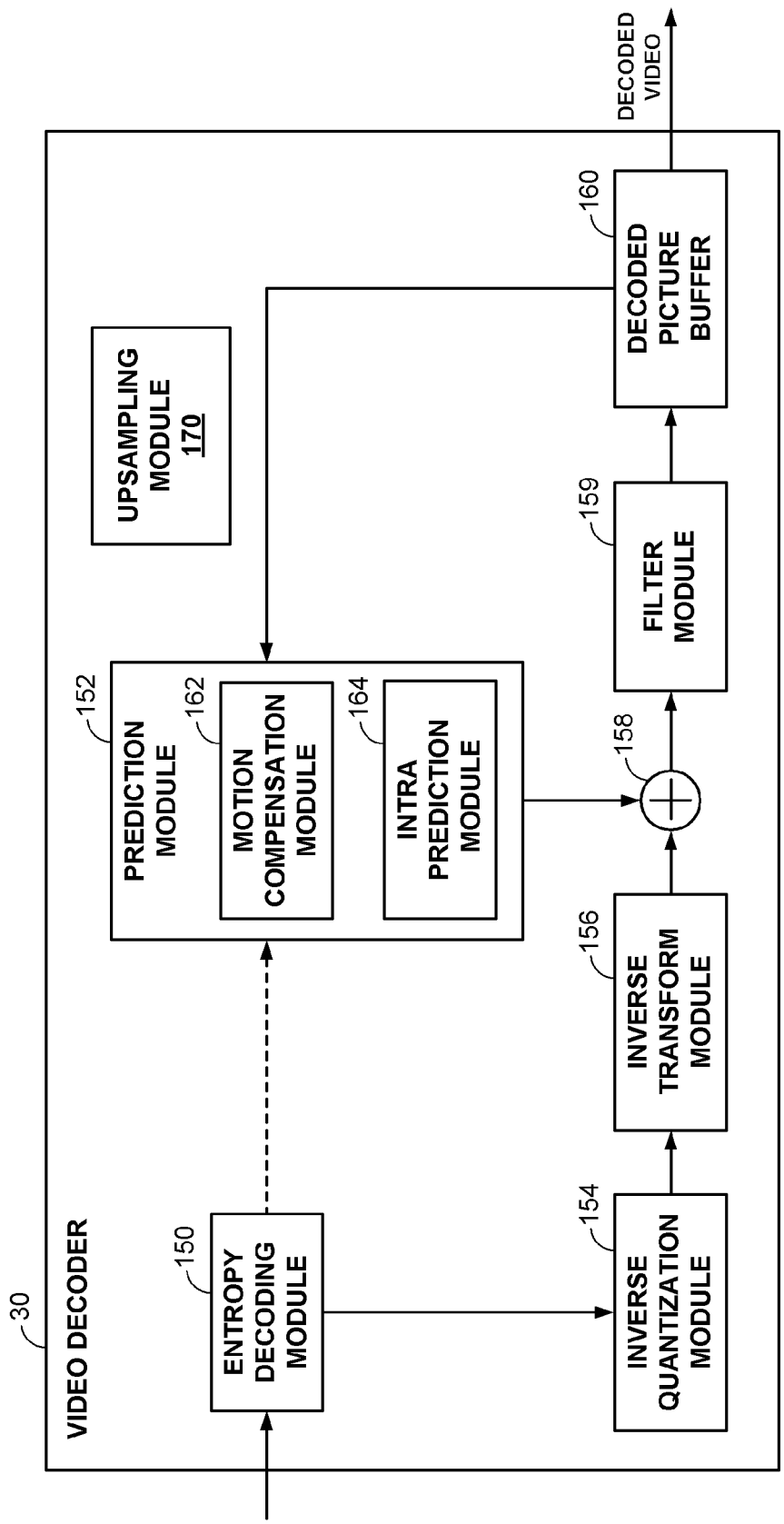
FIG. 3 is a block diagram illustrating an example video decoder that may be configured to implement the techniques of this disclosure.

FIG. 3 is a block diagram that illustrates an example video decoder 30 that can be configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In accordance with embodiments of this disclosure, video decoder 30 can include an upsampling module 170 that may be configured to code (e.g., decode) video data in a scalable video coding scheme that defines at least one base layer and at least one enhancement layer. Upsampling module 170 may upsample at least some video data as part of a decoding process, wherein upsampling is performed in an adaptive manner, such as by using an image filter set selected from a plurality of image filter sets based at least in part on an interlayer prediction type associated with the video data, as described below with respect to FIGS. 4-7, for example.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform entropy decoding operations, such as CABAC decoding operations, on syntax elements in the coded slice header to recover the slice header.

As part of extracting the slice data from coded slice NAL units, entropy decoding module 150 may perform parsing operations that extract syntax elements from coded CUs in the slice data. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to determine the intra prediction mode of the PU.

In some instances, the syntax elements may indicate that intra prediction module 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

The motion compensation loop of HEVC is similar to that in H.264/AVC, i.e., the reconstruction of the current frame $\hat{I}$ may equal de-quantized coefficients r plus temporal prediction P:

$$\hat{I} = r + P \quad (1)$$

where P indicates uni-directional prediction for P frames or bi-directional prediction for B frames.

Figure 4:
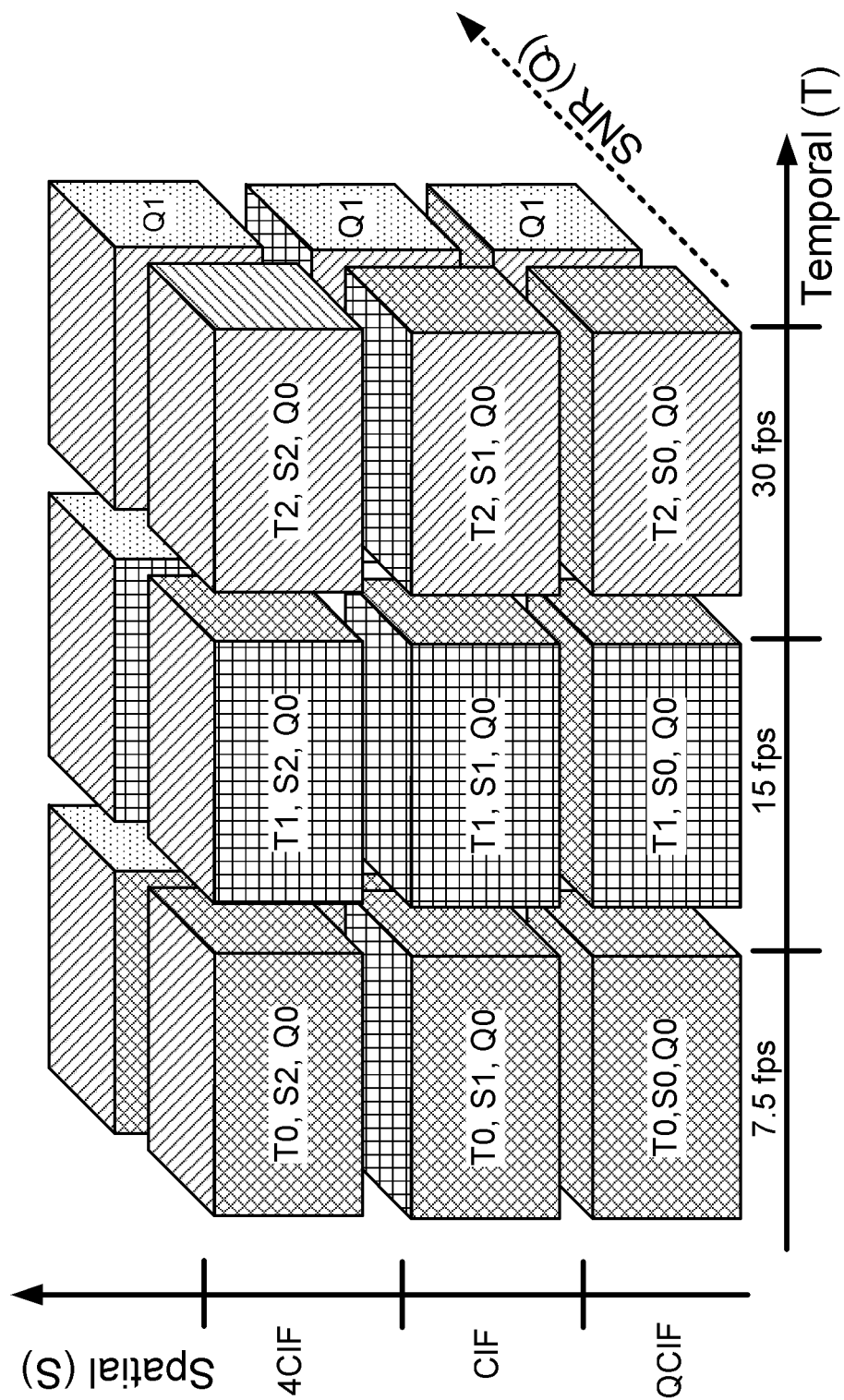
FIG. 4 is a graph illustrating scalabilities in three different dimensions.

There are approximately 35 intra prediction modes available in HEVC. In certain embodiments, the reconstruction of a current frame $\hat{I}$ may also be expressed by equation (1), wherein P indicates intra prediction. FIG. 4 provides a diagram illustrating an embodiment of scalabilities in different dimensions. As shown in the figure, scalabilities may be enabled in three dimensions. For example, with respect to time, frame rates with 7.5 Hz, 15 Hz or 30 Hz may be supported by temporal scalability (T). With respect to spatial scalability (S), different resolutions such as QCIF, CIF and 4CIF may be enabled. For each specific spatial resolution and frame rate, SNR (Q) layers may be added to improve the picture quality. Once video content has been encoded in a scalable way, an extractor tool may be used to adapt delivered content according to application requirements, which may be dependent on, e.g., the transmission channel, and/or other parameters. In the embodiment shown in FIG. 4, each cubic object may contain pictures with substantially the same frame rate (temporal level), spatial resolution and SNR layers. In certain embodiments, improved representation can be achieved by adding cubes (pictures) in one or more dimensions. In addition, combined scalability may be supported when there are two, three or even more scalabilities enabled.

According to the HEVC SVC specification, pictures with the lowest spatial and quality layer may be compatible with H.264/AVC, while pictures at the lowest temporal level may form the temporal base layer, which may be enhanced with pictures at higher temporal levels. In addition to the H.264/AVC compatible layer, several spatial and/or SNR enhancement layers may be added to provide spatial and/or quality scalabilities. As used herein, SNR scalability may also be referred to as quality scalability. Each spatial or SNR enhancement layer itself may be temporally scalable, with the same temporal scalability structure as the H.264/AVC compatible layer. For one spatial or SNR enhancement layer, the lower layer it depends on may also be referred to as the base layer of such spatial or SNR enhancement layer.

Figure 5:
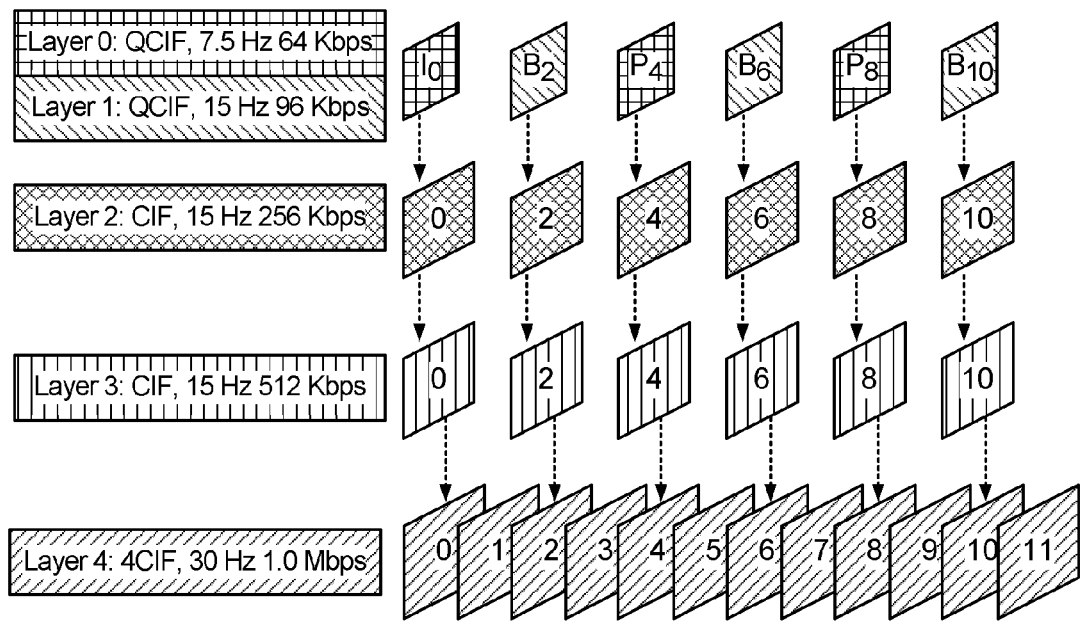
FIG. 5 illustrates a schematic of an example structure of an SVC bitstream.

FIG. 5 illustrates an embodiment of an SVC coding structure. The pictures with the lowest spatial and quality layer (pictures in layer 0 and layer 1, with QCIF resolution) may be compatible with H.264/AVC. Among them, those pictures of the lowest temporal level may form the temporal base layer, as shown in layer 0 of FIG. 5. This temporal base layer (layer 0) can be enhanced with pictures of higher temporal levels (e.g., layer 1). In addition to the H.264/AVC compatible layer, several spatial and/or SNR enhancement layers may be added to provide spatial and/or quality scalabilities. For instance, the enhancement layer may be a CIF representation with substantially the same resolution as layer 2. In the depicted embodiment, layer 3 is an SNR enhancement layer. As shown, spatial or SNR enhancement layers themselves may be temporally scalable, with substantially the same temporal scalability structure as the H.264/AVC compatible layer. Furthermore, an enhancement layer may enhance both spatial resolution and frame rate. For example, layer 4 may provide a 4CIF enhancement layer, which further increases the frame rate from 15 Hz to 30 Hz.

Figure 6A:
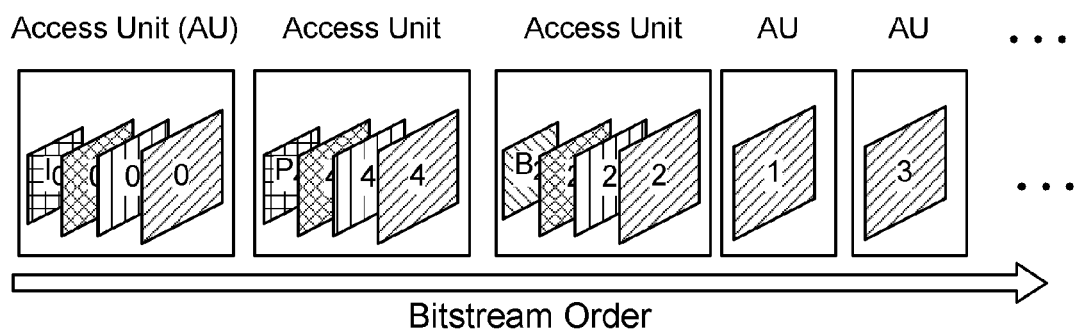
FIG. 6A illustrates a schematic of an example of SVC access units in a bitstream.

As shown in FIG. 6A, coded slices in a single same time instance may be successive in bitstream order and form one access unit in the context of SVC. Those SVC access units may then follow the decoding order, which may be different from the display order and determined, for example, by the temporal prediction relationship.

Some functionalities of SVC are inherited from H.264/AVC. Compared with previous scalable standards, certain advantages of HEVC SVC, namely inter-layer prediction and single-loop decoding, are discussed in greater detail below.

Single-Loop Decoding

To keep a low-complexity decoder, single-loop decoding is mandatory in SVC. With single-loop decoding, each supported layer may be decoded with a single motion compensation loop. To achieve this, the usage of inter-layer intra-prediction is only allowed for enhancement layer macroblocks, for which the co-located reference layer signal is intra-coded. It is further required that all layers that are used to inter-layer predict higher layers are coded using constrained intra-prediction.

Inter-Layer Prediction

SVC provides inter-layer prediction for spatial and/or SNR scalabilities based on texture, residue and motion. Spatial scalability in SVC may relate to any resolution ratio between two layers. In certain embodiments, SNR scalability is realized by Coarse Granularity Scalability (CGS) or Medium Granularity Scalability (MGS). In SVC, different spatial or CGS layers may belong to different dependency layers (e.g., indicated by dependency_id in NAL unit header), while different MGS layers can be in the same dependency layer. A single dependency layer may include quality layers associated with quality_id from 0 to higher values, corresponding to quality enhancement layers. In SVC, inter-layer prediction methods may be utilized to reduce inter-layer redundancy. Various inter-layer prediction methods are described in greater detail below.

Inter-Layer Intra Prediction

In SVC, the coding mode using inter-layer intra prediction may be called "IntraBL" mode in SVC. To enable single-loop decoding, inter-layer intra prediction may be available only with respect to MBs, which have co-located MBs in the base layer coded as constrained intra modes. A constrained intra mode MB is intra-coded without referring to samples from neighboring inter-coded MBs. In embodiments in which multiple-loop decoding is available, there may not be such a restriction on how a co-collocated base layer block is coded. In certain embodiments, co-located MBs may be upsampled according to the spatial resolution ratio.

Inter-Layer Residual Prediction

In embodiments in which an MB is indicated to use residual prediction, co-located base layer MBs for inter-layer prediction may have various constraints. For example, such an MB may be required to be an inter MB; in addition, it may be necessary or desirable to upsample the residue of the MB according to the relevant spatial resolution ratio. The residue difference between an enhancement layer and that of a base layer may be coded and used for prediction purposes. For example, the reconstruction of a current frame $\hat{I}_e$ of an enhancement layer may equals the sum of de-quantized coefficients $r_e$ of the enhancement layer, the temporal prediction $P_e$ from the enhancement layer, and the quantization normalized residual coefficients $r_b$ of the base layer, as provided in equation (2) below.

$$\hat{I}_e = r_e + P_e + r_b \quad (2)$$

Inter-Layer Motion Prediction

Motion vectors of MBs or MB partitions in an enhancement layer may be predicted at least partially based on motion vectors of co-located base layers. For example, such base layer motion vectors may be scaled to generate enhancement layer motion vectors. In addition, there is one MB type named base mode, which may send a flag for each MB indicating whether certain data may be derived from the base layer. In certain embodiments, if the flag is set to 'true,' and the corresponding base layer MB is not intra, then motion vectors, partitioning modes and reference indices are derived from base layer.

HEVC SVC Extension

Similar to H.264/AVC, HEVC may include a video coding extension providing at least temporal scalability, SNR scalability and spatial scalability. Such specifications may depend at least partially on results of a call for proposals, which was released in July 2012.

Difference Domain Prediction for HEVC SVC Extension

Difference domain motion compensation and intra prediction have been proposed for the HEVC SVC extension. Support for coding difference values for enhancement layers may be provided in HEVC SVC. For example, the EL encoder may select on a CU (or a slice) basis whether to encode input pixels themselves ("pixel coding mode") or difference values ("difference coding mode"). In certain embodiments, the coding mode may be signaled with a flag added to the CU (e.g., 'diff_coding_flag'). In pixel coding mode, the input pixels of the input picture may simply be coded as in certain non-scalable coding designs; in difference coding mode, on the other hand, may include coding the difference between the input pixels and the corresponding scaled reference layer (RL) reconstructed pixels. To support difference coding mode, intra-prediction and motion-compensation modules may be modified as described below.

Figure 6B:
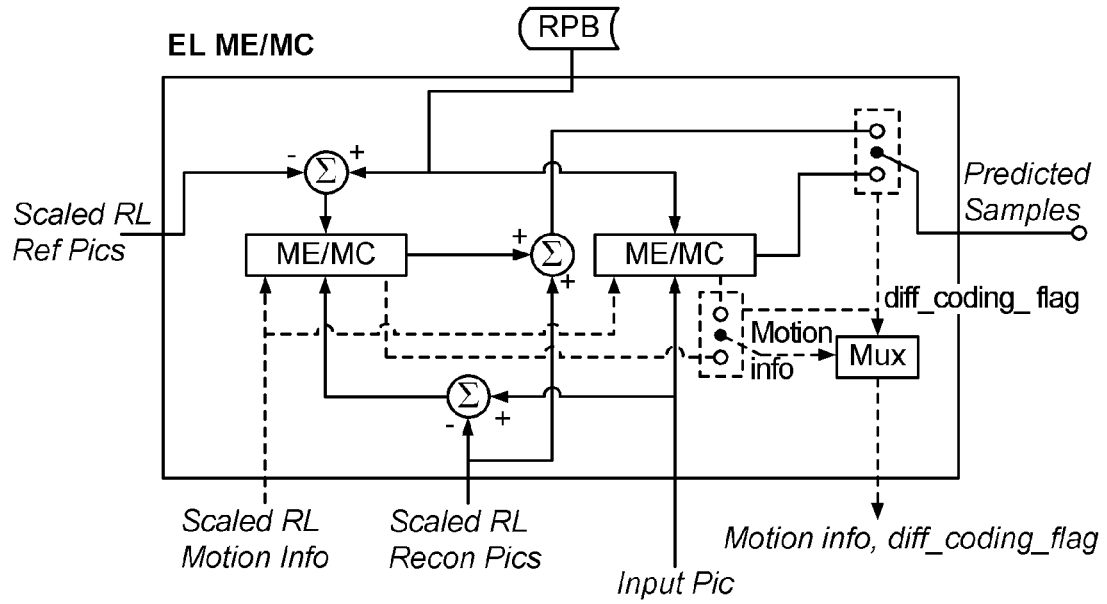
FIG. 6B illustrates a schematic layer ME/MC module built using a base layer ME/MC module.

For inter coding, in certain embodiments, if the difference-coding mode is selected (e.g., diff_coding_flag is set to 1), then a prediction block may comprise difference values between corresponding prediction block samples in a reference picture and corresponding prediction block samples in the scaled RL reference picture (hereinafter referred to as the "difference predicted block"). Reconstructed samples of the co-located RL may then be added to the difference predicted block in order to derive proper reconstructed samples. FIG. 6B shows a schematic layer ME/MC module demonstrating such functionality.

Up-Sampling Process to Base Layer Picture

With respect to spatial scalability, base layer and enhanced layers may have different spatial resolutions. Therefore, it may be necessary or desirable to utilize up-sampling filtering with respect to the base layer to match the spatial aspect ration of the enhanced layer. For example, an up-sampling filter set may be used for the base layer, wherein a filter is chosen from the set according to the fractional pixel shift (i.e., phase). In certain embodiments, phase is calculated based on the spatial aspect ratio and relative pixel grid position between base layer and enhanced layer pictures.

Figure 6C:
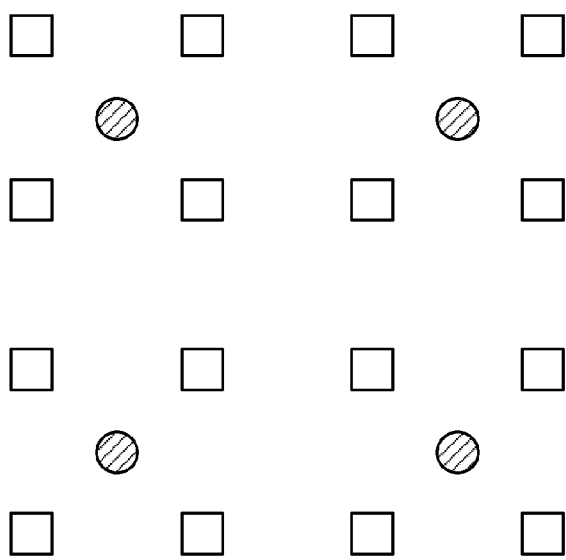
FIG. 6C illustrates relative luma sampling grids of the base layer and enhancement layer in H.264/SVC up-sampling procedure.

FIG. 6C shows an embodiment of a relative luma sampling grid of the base layer and enhancement layer in H.264/SVC up-sampling procedure for dyadic spatial scalability. In certain embodiments, the fractional pixel shift between an enhanced layer and base layer picture is 0.25 and 0.75, as shown. In the H.264/SVC standard, the phase may be quantized with $\frac{1}{16}$ accuracy, which may result in 16 filters in a filter set.

In certain embodiments, a single up-sampling filter may be applied to base layer pictures to generate scaled content for inter-layer prediction. Although a single up-sampling filter may be adequate in certain circumstance, it may not be adequate, or ideal with respect to multiple interlayer prediction types. In certain embodiments, multiple up-sampling filters, or sets of filters, are leveraged to further improve the coding performance of certain inter-layer prediction methods, including, for example, intraBL, difference domain intra and inter prediction, and/or residue prediction. Such concepts are disclosed in greater detail below.

In certain embodiments, a video coding system utilizes multiple up-sampling filters for spatial scalability purposes, as well as multiple pre-processing filters for SNR scalability purposes. For example, dedicated filters to process co-located base-layer samples may be chosen at least partially based on the type of inter-layer prediction being used. In certain embodiments, filter sets may be designed off-line and hard-coded in the system. Alternatively filter sets may be derived according to coding contents and sent in the bits stream. In addition, the phase shift used in down-sampling process may be signaled in the bit stream.

Although certain embodiments disclosed herein are presented in the context of two-layer scalable video coding, one having ordinary skill in the art may appreciate that the disclosed embodiments may be extended to multi-layer cases, such as cases where a single layer has multiple base and/or enhancement layers.

Embodiments of Adaptive Up-Sampling Filters (AUF)

In systems allowing for multiple prediction loops, intra-BL (e.g., without restriction of base-layer coding mode), as well as difference domain intra and inter prediction, can be applied. In certain embodiments, one or more dedicated filter sets may be applied for different prediction modes among a group of filter sets having different frequency response. Such filter sets may be designed off-line and hard-coded in the system, or the optimal filter sets could be derived according to coding contents and sent in the bits stream.

In an embodiment, three up-sampling filter sets having different frequency responses are hard-coded in the system. The dedicated filter sets may be applied, for intra-BL, difference domain intra prediction and difference domain inter prediction, respectively.

In an embodiment, two up-sampling filter sets having different frequency responses are hard-coded in the system. For example, one filter set may be applied for intra-BL prediction, while another filter set may be applied for difference-domain prediction. In certain embodiments, filter set(s) applied for intra-BL prediction are relatively sharp and have a higher cut-off in the frequency response when compared to difference-domain prediction; filter set(s) applied for difference domain prediction may be relatively smooth and have lower cut-off in the frequency response.

In an embodiment, a video coding system includes two up-sampling filter sets having different frequency responses. For example, one filter set may be applied for intra-BL and difference domain intra prediction, while another filter set may be applied for difference domain inter prediction. The filter set applied for intra-BL and difference domain intra prediction may be relatively sharper and have higher cut-off in the frequency response; the filter set applied for difference domain inter prediction may be relatively smoother and have lower cut-off in the frequency response.

The filter sets listed in Table 1 provide an example two filter sets up-sampling embodiment. In certain embodiments, the filter set with lower cut-off in frequency response may be bi-linear. The listed one-dimensional up-sampling filter may used the horizontal direction, vertical direction, or both.

TABLE 1 filter set with higher cut-off in frequency response

| Phase shift | Coefficients |
| --- | --- |
| 0 | {0, 0, 0, 64, 0, 0, 0, 0,} |
| 1 | {0, 1, −3, 63, 4, −2, 1, 0,} |
| 2 | {0, 2, −6, 61, 9, −3, 1, 0,} |
| 3 | {−1, 3, −8, 60, 13, −4, 1, 0,} |
| 4 | {−1, 4, −10, 58, 17, −5, 1, 0,} |
| 5 | {−1, 4, −11, 53, 25, −8, 3, −1,} |
| 6 | {−1, 4, −11, 50, 29, −9, 3, −1,} |
| 7 | {−1, 4, −11, 45, 34, −10, 4, −1,} |
| 8 | {−1, 4, −11, 40, 40, −11, 4, −1,} |
| 9 | {−1, 4, −10, 34, 45, −11, 4, −1,} |
| 10 | {−1, 3, −9, 29, 50, −11, 4, −1,} |
| 11 | {−1, 3, −8, 25, 53, −11, 4, −1,} |
| 12 | {0, 1, −5, 17, 58, −10, 4, −1,} |
| 13 | {0, 1, −4, 13, 60, −8, 3, −1,} |
| 14 | {0, 1, −3, 8, 62, −6, 2, 0,} |
| 15 | {0, 1, −2, 4, 63, −3, 1, 0,} |

TABLE 2 filter set with lower cut-off in frequency response.

| Phase shift | Coefficients |
| --- | --- |
| 0 | {0, −2, 8, 52, 8, −2, 0, 0,} |
| 1 | {0, −1, 5, 51, 11, −3, 1, 0,} |
| 2 | {0, −1, 3, 50, 15, −4, 1, 0,} |
| 3 | {0, −1, 1, 49, 19, −5, 1, 0,} |
| 4 | {0, 1, −3, 47, 23, −5, 1, 0,} |
| 5 | {0, 1, −4, 45, 27, −6, 1, 0,} |
| 6 | {0, 1, −5, 43, 30, −6, 1, 0,} |
| 7 | {0, 1, −6, 41, 34, −7, 1, 0,} |
| 8 | {0, 2, −7, 37, 37, −7, 2, 0,} |
| 9 | {0, 1, −7, 34, 41, −6, 1, 0,} |
| 10 | {0, 1, −6, 30, 43, −5, 1, 0,} |
| 11 | {0, 1, −6, 27, 45, −4, 1, 0,} |
| 12 | {0, 1, −5, 23, 47, −3, 1, 0,} |
| 13 | {0, 1, −5, 19, 59, 1, −1, 0,} |
| 14 | {0, 1, −4, 15, 50, 3, −1, 0,} |
| 15 | {0, 1, −3, 11, 51, 5, −1, 0,} |

In certain embodiments, a dedicated filter set may be signaled in the bit stream. When a filter set is signaled in the bit stream, the corresponding default filter set may be replaced by the signaled filter set; otherwise, the default (e.g., hard-coded) filter set may be used. In certain embodiments, only a subset of available filter sets may be signaled in the bit stream. For example, a filter set for intra-BL prediction mode may be signaled in the bit stream, while other filter sets may not be so signaled. The system may be configured to apply a default hard-coded filter set for difference domain prediction.

Although described generally in the context of multiple loop prediction, certain embodiments disclosed herein may also be applied to single prediction loop cases. For example, difference domain prediction of multiple loop prediction may be interpreted as residue prediction in a single loop prediction.

Multiple Intra-BL Mode Filter Sets

In certain embodiments, intra-BL is a main inter layer prediction tool in the scalable video coding. Therefore, it may be desirable to implement a system using multiple filter sets for intra-BL mode, rather than just one.

In certain embodiments, when a CU/MB/PU/block is coded as intra-BL prediction mode, an index may be signaled to indicate which filter set among a group of intra-BL prediction filter sets is to be applied for the particular CU/MB/PU/ block, or an index may be signaled in larger granularity of area size, such as a group of CUs, LCU, slices, pictures or sequence levels.

In an embodiment, multiple filter sets are applied to reconstructed a base layer picture to generate multiple scaled pictures, wherein the multiple scaled pictures are inserted into the reference list as additional reference pictures for a current enhancement layer picture. For example, such multiple scaled pictures could be inserted into a single identical reference list. In certain embodiments, multiple scaled pictures could be separated and inserted into different reference lists. As an example, scaled pictures with sharp filters may be inserted into a first reference list (i.e., reference list 0), while scaled pictures with smoothed filters may be inserted into a second reference list (i.e., reference list 1). As another example, the scaled pictures may be interleaved according to filter set index, and may be inserted into first and second reference lists, respectively.

In certain embodiments, different filter sets could be applied according to syntax arrangement. For example, when a flag is signaled to indicated whether a CU is intra-BL mode, and the flag is set to true, a dedicated filter may be applied to a base layer picture to generate a prediction; otherwise, when a flag is signaled to indicated whether a PU is intra-BL mode, and the flag is set to true, another dedicated filter may be applied to the base layer picture to generate the prediction.

As described above, to embodiments, a system is configured such that a dedicated filter set may be signaled in the bit stream. When a filter set is signaled in the bit stream, the corresponding default filter set may be replaced by the signaled filter set; otherwise, a default filter set (e.g., hardcoded) may be used. Furthermore, a filter set number to be used for intra-BL mode may likewise be fixed or signaled in the bit stream. In the case of signaling, the signaling parameter may be signaled in a slice head, PPS or SPS, or other syntax level.

Filter Sets Signaling

In certain embodiments, a dedicated filter set may be signaled in the bit stream. For example, the filter set may be signaled in SPS, PPS or slice head level syntax. When the filter is signaled in the SPS level, the signaled filter may be used to replace a default filter in whole sequence. When the filter is signaled in PPS or slice head level, the signaled filter may be used to replace default filter in corresponding picture or slice.

Up-sampling filter coefficients may be coded with a fixed-length code word. For example, the code word length may be determined by a maximum absolute value of the coefficients, or in some other manner.

In certain embodiments, filter coefficients are coded with a certain kind of VLC. For example, the coefficients' absolute value may be coded with an exponential golomb code word, or other coding mechanism. If a coefficient is non-zero, the sign of the coefficient may be coded. Furthermore, filter coefficients could be also be predicted from coefficients of a default filter. Only the difference between coded filter coefficients and default coefficients is that the default coefficients may be VLC coded. In certain embodiments, the filter coefficients may be predicted from previous coded filter code coefficients. For example, when filter coefficients for the horizontal direction are signaled in advance, they may be used to predict filter coefficients for the vertical direction.

In certain embodiments, the filter coefficients may be signaled for horizontal and vertical direction separately. Alternatively, one filter set may be signaled and applied for both horizontal and vertical direction. In certain embodiments, a flag may be signaled indicating whether the filter is shared between horizontal and vertical directions or not.

Phase Shift of Down-Sampling and Up-Sampling Process

Figure 6D:
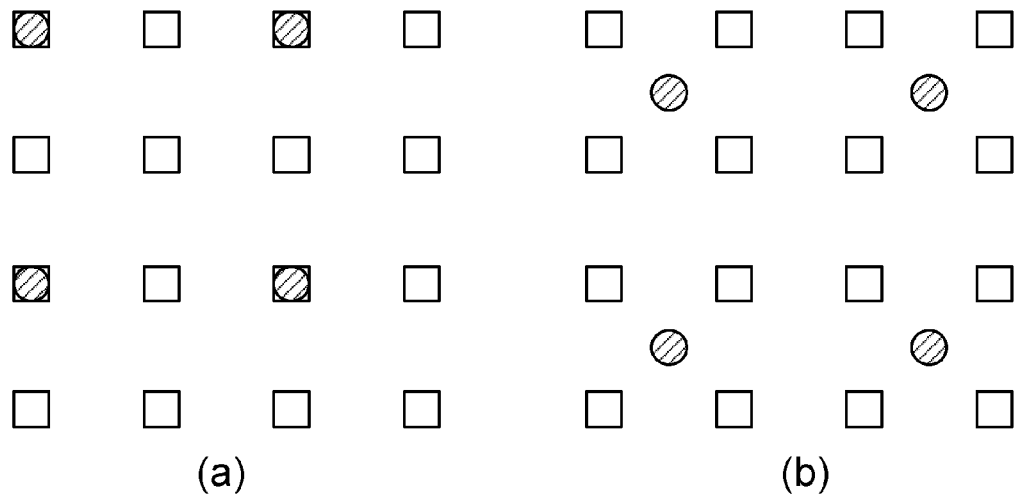
FIG. 6D illustrates relative luma sampling grids of original and 1.5× down-sampled video.
Figure 6E:
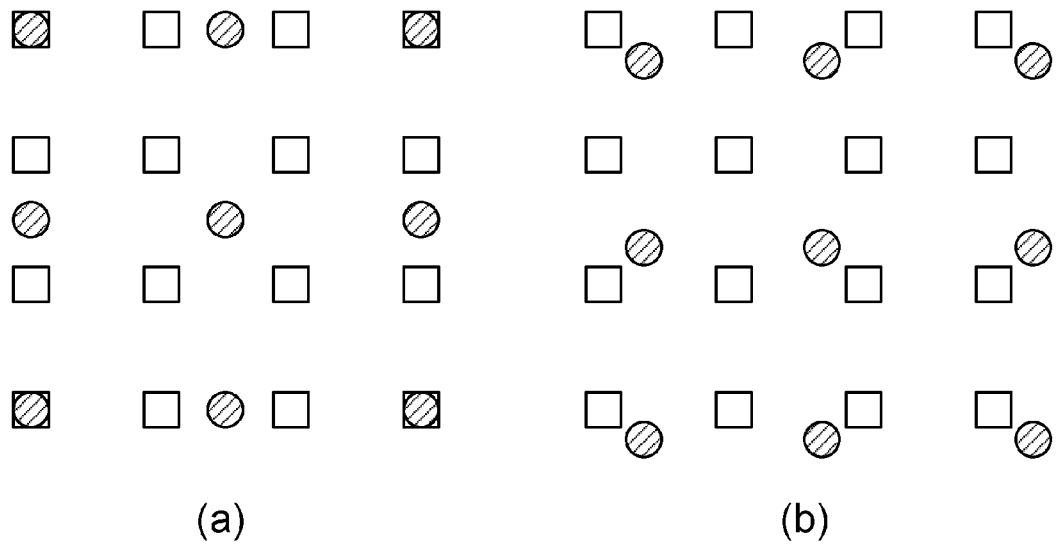
FIG. 6E illustrates the relative luma sampling grids of original and 2× down-sampled video.

A base layer picture may be generated by down-sampling the original enhanced layer picture. FIGS. 6D and 6E show two embodiments of down-sampling schemes in which phase shift between down-sampled videos and related original videos are applied. More particularly, FIG. 6D provides relative luma sampling grids of the original (squares) and 2× down-sampled video (circles), while FIG. 6E provides relative luma sampling grids of the original and 1.5× downsampled video. In down-sampling scheme (a), the top-left pixel grid of down-sampled picture and original picture are aligned. The phase shift of the top-left grid between down-sampled picture and original picture is zero. In down-sampling scheme (b), the phase shift between down-sampled picture and original picture are equally distributed in all pixel grids. The global phase shift between down-sampled picture and original picture are zero.

When a reconstructed base layer picture is up-sampled and used as prediction of enhancement layer picture coding, it may be necessary to determine relative position of pixel grid between the downsampled base layer picture and the original enhancement layer picture in order to determine the proper up-sampled contents. In certain embodiments, phase shift information relating to the downsampling process is signaled in the bit stream. For example, phase shift information may be signaled as SPS syntax element, or in another region of the bit stream. In an embodiment, phase shift information is signaled in SPS is a flag. The flag may be used to indicate which of a set of downsampling schemes (e.g., the schemes referenced above) is applied to generate the downsampled base layer picture.

Figure 7:
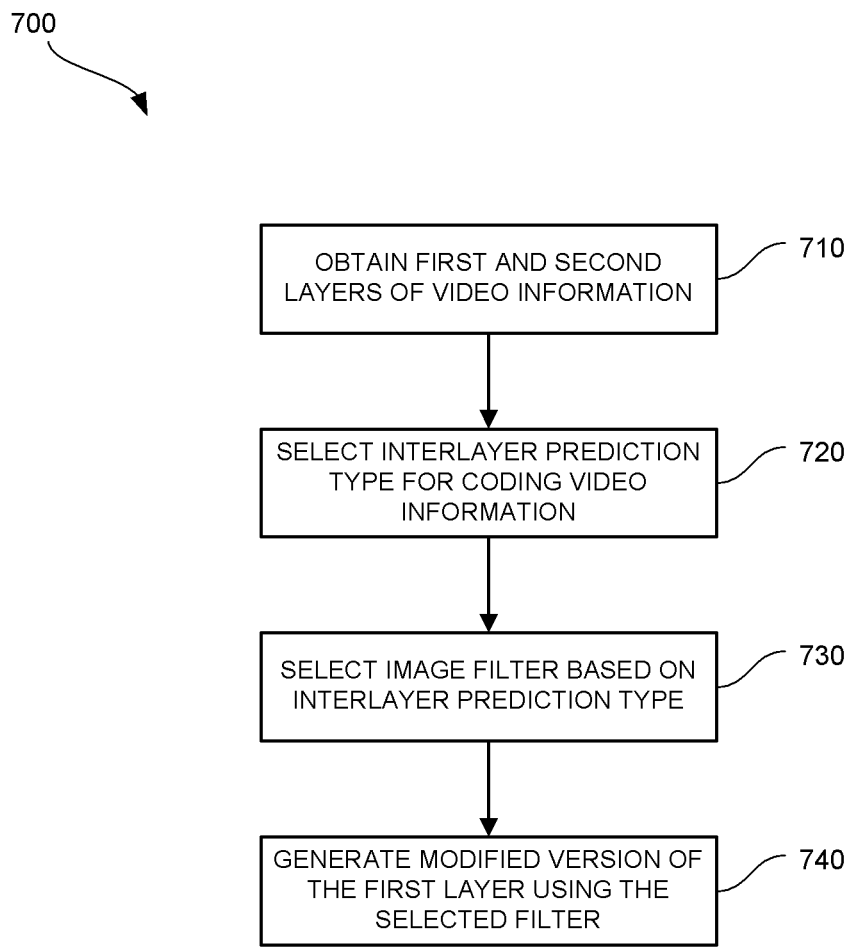
FIG. 7 is a flow chart illustrating an embodiment of a process 700 for coding video information.

FIG. 7 illustrates an embodiment of a process 700 for coding video information. The process may include obtaining first and second layers of video information, as illustrated at block 710. The process 700 further includes selecting an interlayer prediction type for coding at least part of the video information. At block 730, an image filter is selected from among a set or group of sets of image filters based at least in part on the interlayer prediction type selected. Furthermore, the process 700 includes generating a modified version of the first layer using the selected filter. For example, the modified version of the first layer may be an up-sampled version of the first layer, wherein the selected image filter is an up-sampling filter.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to code video information, the device comprising:
a processor configured to:
obtain a first layer and a second layer of video information;
identify an image filter set from a plurality of image filter sets comprising a first image filter set and a second image filter set based at least in part on an interlayer prediction type associated with the video information, wherein each of the plurality of image filter sets includes one or more image filters, wherein the processor is further configured to (i) identify the first image filter set based on the interlayer prediction type corresponding to inter layer intra prediction and (ii) identify the second image filter set based on the interlayer prediction type corresponding to one of difference domain intra prediction or difference domain inter prediction; and
generate a modified version of the first layer using the first layer and the identified image filter set; and
a memory in communication with the processor, the memory configured to store the modified version of the first layer.

2. The device of claim 1, wherein the interlayer prediction type is one of: inter-layer intra prediction, difference domain intra prediction, or difference domain inter prediction.

3. The device of claim 1, wherein the plurality of image filter sets includes an up-sampling filter set.

4. The device of claim 3, wherein the second layer of information provides spatial scalability.

5. The device of claim 1, wherein the plurality of image filter sets includes a preprocessing filter set, and wherein the second layer of information provides SNR scalability.

6. The device of claim 1, wherein the plurality of image filter sets includes a down-sampling filter set.

7. The device of claim 1, wherein the first layer is a base layer and the second layer is an enhancement layer.

8. The device of claim 1, the device further comprising at least one image filter circuit configured to apply the plurality of image filter sets.

9. The device of claim 1, wherein the plurality of image filter sets is stored in the memory.

10. The device of claim 1, wherein each image filter set of the plurality of image filter sets comprises a plurality of coefficients.

11. The device of claim 10, wherein the processor is further configured to:
decode the coefficients from the video information; and
receive a syntax element extracted from an encoded video bit stream, the syntax element comprising an indication of the interlayer prediction type.

12. The device of claim 10, wherein the processor is further configured to:
encode the coefficients in the video information; and
generate a syntax element for an encoded video bit stream based at least in part on the interlayer prediction type.

13. The device of claim 10, wherein at least one image filter set of the plurality of image filter sets comprises coefficients $\{0, 0, 0, 64, 0, 0, 0, 0\}$ for a phase shift of zero, $\{0, 1, -3, 63, 4, -2, 1, 0\}$ for a phase shift of one, $\{0, 2, -6, 61, 9, 3, 1, 0\}$ for a phase shift of two, $\{-1, 3, -8, 60, 13, -4, 1, 0\}$ for a phase shift of three, $\{-1, 4, -10, 58, 17, -5, 1, 0\}$ for a phase shift of four, $\{-1, 4, -11, 53, 25, -8, 3, -1\}$ for a phase shift of five, $\{-1, 4, -11, 50, 29, -9, 3, -1\}$ for a phase shift of six, $\{-1, 4, -11, 45, 34, -10, 4, -1\}$ for a phase shift of seven, $\{-1, 4, -11, 40, 40, -11, 4, -\}$ for a phase shift of eight, $\{-1, 4, -10, 34, 45, -11, 4, -1\}$ for a phase shift of nine, $\{-1, 3, -9, 29, 50, -11, 4, -1\}$ for a phase shift of ten, $\{-1, 3, -8, 25, 53, -11, 4, -1\}$ for a phase shift of eleven, $\{0, 1, -5, 17, 58, -10, 4, -1\}$ for a phase shift of twelve, $\{0, 1, -4, 13, 60, -8, 3, -1\}$ for a phase shift of thirteen, $\{0, 1, -3, 8, 62, -6, 2, 0\}$ for a phase shift of fourteen, and $\{0, 1, -2, 4, 63, -3, 1, 0\}$ for a phase shift of fifteen.

14. The device of claim 10, wherein at least one image filter set of the plurality of image filter sets comprises coefficients $\{0, -2, 8, 52, 8, -2, 0, 0\}$ for a phase shift of zero, $\{0, -1, 5, 51, 11, -3, 1, 0\}$ for a phase shift of one, $\{0, -1, 3, 50, 15, -4, 1, 0\}$ for a phase shift of two, $\{0, -1, 1, 49, 19, -5, 1, 0\}$ for a phase shift of three, $\{0, 1, -3, 47, 23, -5, 1, 0\}$ for a phase shift of four, $\{0, 1, -4, 45, 27, -6, 1, 0\}$ for a phase shift of five, $\{0, 1, -5, 43, 30, -6, 1, 0\}$ for a phase shift of six, $\{0, 1, -6, 41, 34, −7, 1, 0} for a phase shift of seven, {0, 2, −7, 37, 37, −7, 2, 0} for a phase shift of eight, {0, 1, −7, 34, 41, −6, 1, 0} for a phase shift of nine, {0, 1, −6, 30, 43, −5, 1, 0} for a phase shift of ten, {0, 1, −6, 27, 45, −4, 1, 0} for a phase shift of eleven, {0, 1, −5, 23, 47, −3, 1, 0} for a phase shift of twelve, {0, 1, −5, 19, 59, 1, −1, 0} for a phase shift of thirteen, {0, 1, −4, 15, 50, 3, −1, 0} for a phase shift of fourteen, and {0, 1, −3, 11, 51, 5, −1, 0} for a phase shift of fifteen.

15. The device of claim 1, wherein the plurality of image filter sets further comprises a third image filter set, wherein the processor is further configured to:
   identify the second image filter set based on the interlayer prediction type corresponding to difference domain intra prediction; and
   identify the third image filter set based on the interlayer prediction type corresponding to difference domain inter prediction.

16. The device of claim 1, wherein the first image filter set has higher frequency response cut-off than the second image filter set.

17. The device of claim 1, wherein the plurality of image filter sets further comprises a third image filter set, wherein the processor is further configured to:
   identify the third image filter set based on the interlayer prediction type corresponding to one of inter layer intra prediction or difference domain intra prediction; and
   identify the second image filter set based on the interlayer prediction type corresponding to difference domain inter prediction.

18. The device of claim 17, wherein the third image filter set has higher frequency response cut-off than the second image filter set.

19. The device of claim 1, wherein the device is selected from the group consisting of a desktop computer, a notebook computer, a tablet computer, a set-top box, a telephone handset, a television, a camera, a display device, a digital media player, a video gaming console, and a video streaming device that comprises the memory and processor.

20. A method of coding video information, comprising:
   obtaining a first layer and a second layer of video information;
   identifying an image filter set from a plurality of image filter sets comprising a first image filter set and a second image filter set based at least in part on an interlayer prediction type associated with the video information, wherein each of the plurality of image filter sets includes one or more image filters, wherein identifying the image filter set comprises performing one of (i) identifying the first image filter set based on the interlayer prediction type corresponding to inter layer intra prediction or (ii) identifying the second image filter set based on the interlayer prediction type corresponding to one of difference domain intra prediction or difference domain inter prediction; and
   generating a modified version of the first layer using the first layer and the identified image filter set.

21. The method of claim 20, wherein generating the modified version of the first layer comprises up-sampling the first layer at least partially by using the identified image filter set.

22. The method of claim 20, wherein identifying the image filter set comprises locating signal data in the video information indicating a filter type associated with the identified image filter set.

23. The method of claim 20, wherein the first layer is a base layer and the second layer is an enhancement layer.

24. The method of claim 20, wherein coefficients associated with at least one of the plurality of image filter sets are received with the video information.

25. The method of claim 20, further comprising providing a signal indicating a downsampling phase shift in a bit stream containing the modified version of the first layer.

26. The method of claim 20, wherein the interlayer prediction type is one of: inter-layer intra prediction, difference domain intra prediction, or difference domain inter prediction.

27. The method of claim 21, wherein the second layer of information provides spatial scalability.

28. The method of claim 20, wherein the plurality of image filter sets includes a preprocessing filter set, and wherein the second layer of information provides SNR scalability.

29. The method of claim 20, wherein at least one image filter set of the plurality of image filter sets comprises coefficients {0, 0, 0, 64, 0, 0, 0, 0} for a phase shift of zero, {0, 1, −3, 63, 4, −2, 1, 0} for a phase shift of one, {0, 2, −6, 61, 9, 3, 1, 0} for a phase shift of two, {−1, 3, −8, 60, 13, −4, 1, 0} for a phase shift of three, {−1, 4, −10, 58, 17, −5, 1, 0} for a phase shift of four, {−1, 4, −11, 53, 25, −8, 3, −1} for a phase shift of five, {−1, 4, −11, 50, 29, −9, 3, −1} for a phase shift of six, {−1, 4, −11, 45, 34, −10, 4, −1} for a phase shift of seven, {−1, 4, −11, 40, 40, −11, 4, −1} for a phase shift of eight, {−1, 4, −10, 34, 45, −11, 4, −1} for a phase shift of nine, {−1, 3, −9, 29, 50, −11, 4, −1} for a phase shift of ten, {−1, 3, −8, 25, 53, −11, 4, −1} for a phase shift of eleven, {0, 1, −5, 17, 58, −10, 4, −1} for a phase shift of twelve, {0, 1, −4, 13, 60, −8, 3, −1} for a phase shift of thirteen, {0, 1, −3, 8, 62, −6, 2, 0} for a phase shift of fourteen, and {0, 1, −2, 4, 63, −3, 1, 0} for a phase shift of fifteen.

30. The method of claim 20, wherein at least one image filter set of the plurality of image filter sets comprises coefficients {0, −2, 8, 52, 8, −2, 0, 0} for a phase shift of zero, {0, −1, 5, 51, 11, −3, 1, 0} for a phase shift of one, {0, −1, 3, 50, 15, −4, 1, 0} for a phase shift of two, {0, −1, 1, 49, 19, −5, 1, 0} for a phase shift of three, {0, 1, −3, 47, 23, −5, 1, 0} for a phase shift of four, {0, 1, −4, 45, 27, −6, 1, 0} for a phase shift of five, {0, 1, −5, 43, 30, −6, 1, 0} for a phase shift of six, {0, 1, −6, 41, 34, −7, 1, 0} for a phase shift of seven, {0, 2, −7, 37, 37, −7, 2, 0} for a phase shift of eight, {0, 1, −7, 34, 41, −6, 1, 0} for a phase shift of nine, {0, 1, −6, 30, 43, −5, 1, 0} for a phase shift of ten, {0, 1, −6, 27, 45, −4, 1, 0} for a phase shift of eleven, {0, 1, −5, 23, 47, −3, 1, 0} for a phase shift of twelve, {0, 1, −5, 19, 59, 1, −1, 0} for a phase shift of thirteen, {0, 1, −4, 15, 50, 3, −1, 0} for a phase shift of fourteen, and {0, 1, −3, 11, 51, 5, −1, 0} for a phase shift of fifteen.

31. The method of claim 20, wherein the plurality of image filter sets further comprises a third image filter set, wherein identifying the image filter set comprises performing one of:
   identifying the first image filter set based on the interlayer prediction type corresponding to inter layer intra prediction;
   identifying the second image filter set based on the interlayer prediction type corresponding to difference domain intra prediction; or
   identifying the third image filter set based on the interlayer prediction type corresponding to difference domain inter prediction.

32. The method of claim 20, wherein the first image filter set has higher frequency response cut-off than the second image filter set.

33. The method of claim 20, wherein the plurality of image filter sets further comprises a third image filter set, wherein identifying the image filter set comprises performing one of:

identifying the third image filter set based on the interlayer prediction type corresponding to one of inter layer intra prediction or difference domain intra prediction; and identifying the second image filter set based on the interlayer prediction type corresponding to difference domain inter prediction.

34. The method of claim 33, wherein the third image filter set has higher frequency response cut-off than the second image filter set.

35. The method of claim 20, further comprising receiving a syntax element extracted from an encoded video bit stream, the syntax element comprising an indication of the interlayer prediction type.

36. The method of claim 20, further comprising generating a syntax element for an encoded video bit stream based at least in part on the interlayer prediction type.

37. An apparatus for coding a video bitstream defining a first layer and a second layer of video information, comprising:

means for identifying an image filter set from a plurality of image filter sets comprising a first image filter set and a second image filter set based at least in part on an interlayer prediction type associated with the video information, wherein the means for identifying the image filter set is configured to (i) identify the first image filter set based on the interlayer prediction type corresponding to inter layer intra prediction and (ii) identify the second image filter set based on the interlayer prediction type corresponding to one of difference domain intra prediction or difference domain inter prediction;

means for generating a modified version of the first layer using the first layer and the identified image filter set; and means for storing the modified version of the first layer.

38. The apparatus of claim 37, wherein the interlayer prediction type is one of: inter-layer intra prediction, difference domain intra prediction, or difference domain inter prediction.

39. The apparatus of claim 37, wherein the first layer is a base layer and the second layer is an enhancement layer.

40. A non-transitory computer-readable medium having stored thereon instructions that, when executed by a processor, cause the processor to:

obtain a first layer and a second layer of video information;

identify an image filter set from a plurality of image filter sets comprising a first image filter set and a second image filter set based at least in part on an interlayer prediction type associated with the video information, wherein the instructions further cause the processor to (i) identify the first image filter set based on the interlayer prediction type corresponding to intra prediction and (ii) identify the second image filter set based on the interlayer prediction type corresponding to one of difference domain intra prediction or difference domain inter prediction; and generate a modified version of the first layer using the first layer and the identified image filter set.

41. The non-transitory computer readable medium of claim 40, wherein the interlayer prediction type is one of: inter-layer intra prediction, difference domain intra prediction, or difference domain inter prediction.

42. The non-transitory computer readable medium of claim 40, wherein the first layer is a base layer and the second layer is an enhancement layer.

* * * * *